US008598512B2

(12) United States Patent
Gordon et al.

(10) Patent No.: US 8,598,512 B2
(45) Date of Patent: Dec. 3, 2013

(54) MASS SPECTROMETER AND METHOD OF MASS SPECTROMETRY

(75) Inventors: David Gordon, Manchester (GB); David Richard Little, Macclesfield (GB); Amir Farooq, Oldham (GB)

(73) Assignee: Micromass UK Limited, Manchester (GB)

( * ) Notice: Subject to any disclaimer, the term of this patent is extended or adjusted under 35 U.S.C. 154(b) by 586 days.

(21) Appl. No.: 12/474,562

(22) Filed: May 29, 2009

(65) Prior Publication Data

US 2010/0301201 A1 Dec. 2, 2010

(51) Int. Cl.
*B01D 59/44* (2006.01)

(52) U.S. Cl.
USPC ............................ 250/282; 250/281; 250/283

(58) Field of Classification Search
USPC ............................ 250/282
See application file for complete search history.

(56) References Cited

U.S. PATENT DOCUMENTS

| | | | | |
|---|---|---|---|---|
| 3,639,741 | A * | 2/1972 | Carrick | 341/132 |
| 4,507,555 | A * | 3/1985 | Chang | 250/281 |
| 2004/0181351 | A1* | 9/2004 | Thompson et al. | 702/76 |

FOREIGN PATENT DOCUMENTS

| | | |
|---|---|---|
| WO | 03087702 | 10/2003 |

OTHER PUBLICATIONS

PCT International Search Report for PCT/GB2010/050926, dated Oct. 8, 2010, 5 pages.
PCT International Written Opinion Report for PCT/GB2010/050926, dated Oct. 8, 2010, 4 pages.

* cited by examiner

*Primary Examiner* — Phillip A Johnston
(74) *Attorney, Agent, or Firm* — Waters Technologies Corporation

(57) ABSTRACT

The invention relates to a method of derivina improved data from a mass spectrometer. The method includes operating the mass spectrometer in a mode enabling quantitation; assigning a threshold value for the total ion current (TIC) above which at least MS and/or MSMS data is desired; and triggering the mass spectrometer out of the mode enabling quantitation into at least an MS and/or MSMS mode when said TIC rises above the threshold but triggering only at such time at or after a confirmed TIC maxima has been reached.

18 Claims, 4 Drawing Sheets

MASS SPECTROMETER AND METHOD OF MASS SPECTROMETRY

The present invention relates to the field of mass spectrometry.

BACKGROUND ART

It is often useful to determine the presence of particular substances within biological mixtures that may be separated by Liquid Chromatography. In many instances it is also desirable to quantify the amounts of these particular samples in the biological mixtures. Typically this would be done using a Triple Quadrupole mass spectrometer. Typically the mass spectrometer is set to multiple reaction monitoring mode (MRM). In MRM the mass spectrometer has its first quadrupole set to transmit the mass of only the desired parent ion. The collision cell then fragments the parent ions into numerous daughter ions, and the third quadrupole is set to transmit only a selected daughter ion produced by fragmentation of the parent ion. A detector measures the ion current that has been transmitted through the whole apparatus and produces a chromatogram for the specific fragment of the ion of interest. A threshold is set for the total ion current (TIC) such that when the total ion current exceeds the threshold the mass spectrometer switches modes from MRM to a confirmatory mode for a predetermined period of time at which the third quadrupole scans the through the mass range in order to obtain a spectrum of all the fragments produced. This spectrum acts as a confirmation that the parent ion is the ion anticipated to be the parent by review of the fragments produced.

The height of the chromatography peak and the area of the peak may both be used in order to calculate the quantity of the daughter ion that is present in the sample, and from this by comparison with a calibration curve, the quantity of the parent present.

However, switching from MRM to confirmatory mode limits the accuracy of the quantitation possible within the mass spectrometer. This is a particular problem when the Liquid Chromatograph is running at high pressure, which reduces the width of the chromatography peak. The triggering of the confirmatory scan will remove data from the chromatogram produced by the mass spectrometer. If the chromatography peak is narrow, this information may include the peak rather than solely information leading up to the peak, which has a severe impact on the capability of calculating the quantity of the daughter ions present because the data including the peak height being lost. This also prevents an accurate value for the peak area to be calculated.

It is therefore desired to produce a method of quantitation in a Liquid Chromatography/Mass spectrometry system which will be capable of measuring the peak height in all cases and also to allow a confirmation scan to be performed.

SUMMARY OF THE INVENTION

In this application the term, the quantitative modes refers to any mode in which quantitation can be performed by the mass spectrometer. In triple quadrupole mass spectrometers this is generally MRM or SIR (single ion recording) modes. SIR is also known in some circles as SIM (Single Ion Monitoring).

Other instruments may be operated in slightly different ways yet may still be capable of performing in a quantitative mode. In a QTOF type machine, an MRM type mode of operation may be feasible. It would also be apparent to one skilled in the art that the third quadrupole may act as a 2-d ion trap.

The invention provides a method of deriving improved data from a mass spectrometer comprising the steps of operating said mass spectrometer in a mode enabling quantitation; assigning a threshold value for the TIC above which at least MS and/or MSMS data is desired; triggering said mass spectrometer out of said mode enabling quantitation into at least an MS and/or MSMS mode when said TIC rises above said threshold but triggering only at such time at or after a confirmed TIC maxima has been reached.

According to a feature of the invention, said confirmed TIC maxima may be identified by reference to a number n of TIC values that have a descending trend. The said number n may be in the range 1-10. Preferably, number n is 3. Alternatively, the number n may be 4.

According to another feature of the invention, the confirmed TIC maxima may be identified by a 2nd order differential.

According to a still further feature of the invention, the threshold value for the TIC may be a multiple of predetermined background noise level. Preferably, the predetermined background noise level is determined by calculating the average level of noise over a number of data points.

According to yet another feature of the invention, the threshold value for the TIC may be the differential of the rate of change of signal against time.

According to a still further feature of the invention, the method may further comprise a reset threshold. Preferably, the reset threshold is a function of said threshold value.

BRIEF DESCRIPTION OF THE DRAWINGS

Various embodiments of the present invention will now be described, by way of example only, and with reference to the accompanying drawings in which.

DETAILED DESCRIPTION OF THE PREFERRED EMBODIMENT

Figure 1:
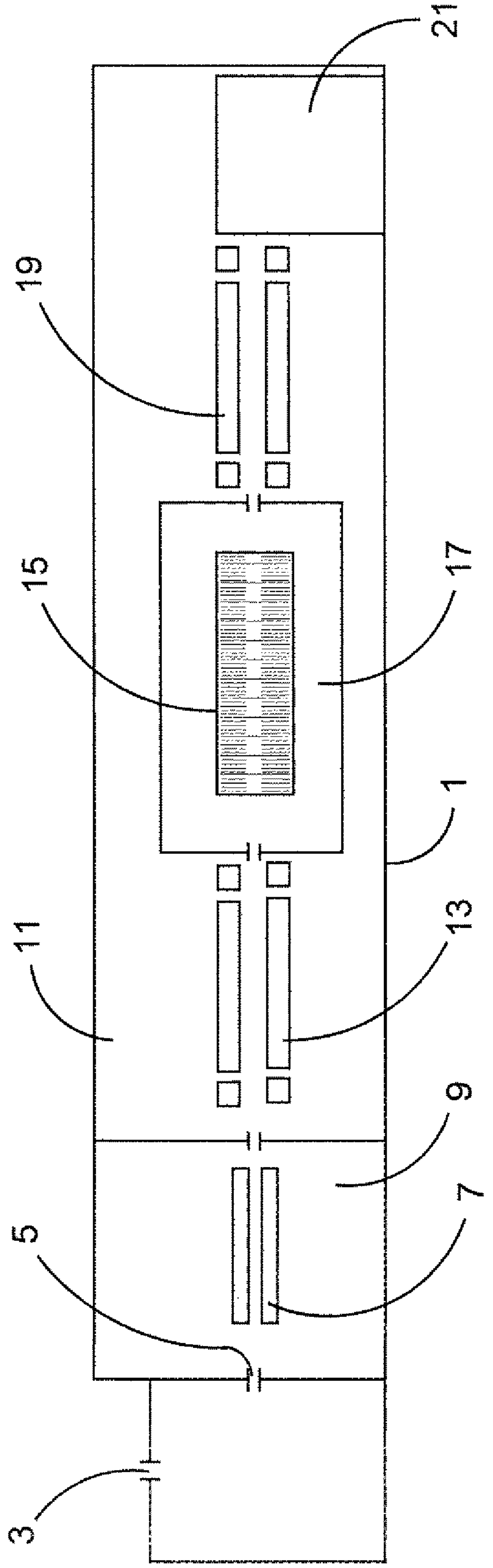
FIG. 1 is a schematic view of a triple quadrupole mass spectrometer.

FIG. 1 shows a typical triple quadrupole mass spectrometer (1) which may be used in association with the invention. The mass spectrometer comprises an ionisation source (3) which ionises the eluant from a chromatography column (not shown). After the eluant is ionised, the ions must pass into the mass spectrometer. Typically the ions pass through the inlet (5) of the mass spectrometer into an ion guide (7) in an initial vacuum chamber (9) which guides the ions along the vacuum chamber and into a further vacuum chamber (11). Inside the further vacuum chamber (11) is a first quadrupole mass analyser (13). Downstream of the first quadrupole analyser is a collision cell (15) which is located in a higher pressure cell (17). Downstream of the collision cell is a second quadrupole mass analyser (19). Ions that have been transmitted through the mass spectrometer are detected by a detector (21).

The ionisation source may be any type of ionisation source. For example this may be an Electrospray ion source; an Atmospheric Pressure Chemical Ionisation ("APCI") ion source; an Electron Impact ("EI") ion source; an Atmospheric Pressure Photon Ionisation ("APPI") ion source; a Chemical Ionisation ("CI") ion source; a Fast Atom Bombardment ("FAB") ion source; a Liquid Secondary Ions Mass Spectrometry ("LSIMS") ion source; an Inductively Coupled Plasma ("ICP") ion source; a Field Ionisation ("FI") ion source; a Field Desorption ("FD") ion source, A Matrix Assisted laser desorption ionisation ion source ("MALDI") or a Laser Desorption Ionisation ("LDI") ion source.

Typical ion guides in the first vacuum chamber can include octapole rod sets, segmented rod sets, hexapole rod sets, ion tunnels, ion funnels or T-Wave ion guides.

The first quadrupole mass analyser may be arranged to work in a static mode, where the mass analyser transmits ions of only one mass, in a band pass mode, where ions in a mass range are transmitted, in a scanning mode, where the mass analyser transmits ions in sequence by scanning different masses, or in a ion guide mode, where substantially all the ions are transmitted through the mass analyser.

The collision cell may be an quadrupole rod set, an ion tunnel, an ion funnel, a t-wave ion guide, a segmented rod set, a hexapole rod set or any other multipole rod set. The collision cell may be in a high collision energy mode in order to cause fragmentation or in a low collision energy mode in order to limit fragmentation.

The second quadrupole mass analyser may be arranged to work in a static mode, where the mass analyser transmits ions of only one mass, in a band pass mode, where ions in a mass range are transmitted, in a scanning mode, where the mass analyser transmits ions in sequence by scanning different masses, or in a ion guide mode, where substantially all the ions are transmitted through the mass analyser.

In the preferred embodiment the mass spectrometer is set to multiple reaction monitoring (MRM) mode. In MRM mode the mass spectrometer has its first quadrupole set in a static mode so as to transmit the mass of only the desired parent ion. The collision cell then fragments the parent ions into numerous daughter ions, and the third quadrupole is set to transmit only a selected daughter ion produced by fragmentation of the parent ion. A detector measures the ion current that has been transmitted through the whole apparatus and produces a chromatogram for the specific fragment of the ion of interest. A threshold is set for the total ion current such that when the total ion current exceeds the threshold the mass spectrometer switches modes from MRM mode to a confirmatory mode for a predetermined period of time during which the third quadrupole scans through the mass range up to approximately the mass of the parent ion in order to acquire a spectrum of all the fragments produced. However, this switching is triggered only at a point at which, or after, the peak maximum TIC has been reached. This spectrum acts as a confirmation that the parent ion is the ion anticipated to be the parent by review of the fragments produced. It also confirms that the collision cell is working correctly by review of the ratio of these fragments compared to a previous calibration.

The height of the chromatography peak and the area of the peak may both be used in order to calculate the quantity of the daughter ion that is present in the sample. From this by comparison with a calibration curve, the quantity of the parent ion which may be present can be calculated.

In the preferred embodiment the confirmation scan is triggered by the occurrence of a number n of TIC values that have a descending trend.

In the preferred embodiment this is at the occurrence of three consecutive descending values of TICs.

In one embodiment the number n of TIC values that have a descending trend may be between 1 and 10

In a further embodiment the number n of TIC values that have a descending trend may be 4

In a further embodiment the number n of TIC values that have a descending trend may be 3

In less preferred embodiments the confirmation scan may be triggered by a descending moving average of a given number of data points, i.e. after the trigger, when the average of a number (n) data points goes down, the peak must have passed the highest point.

In a further embodiment a 2nd order differential may be used to calculate the point of inflection of the peak. In this embodiment a real time analysis of the rate of change of the rate of change of the signal would be necessary.

Figure 2:
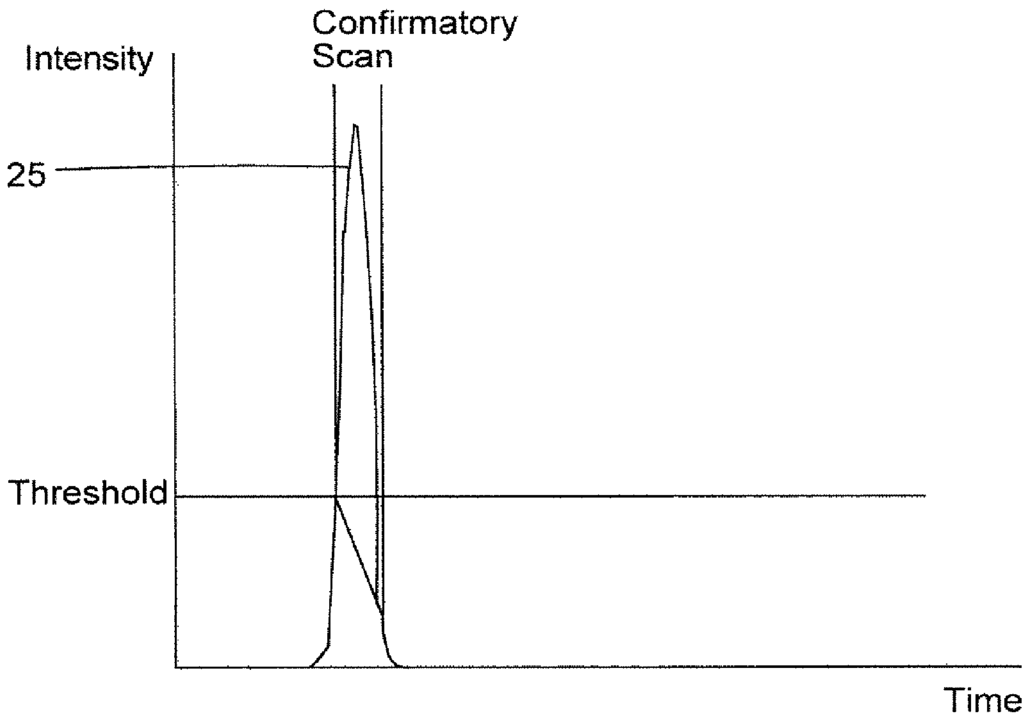
FIG. 2 shows a chromatographic peak analysed in accordance with the prior art.
Figure 3:
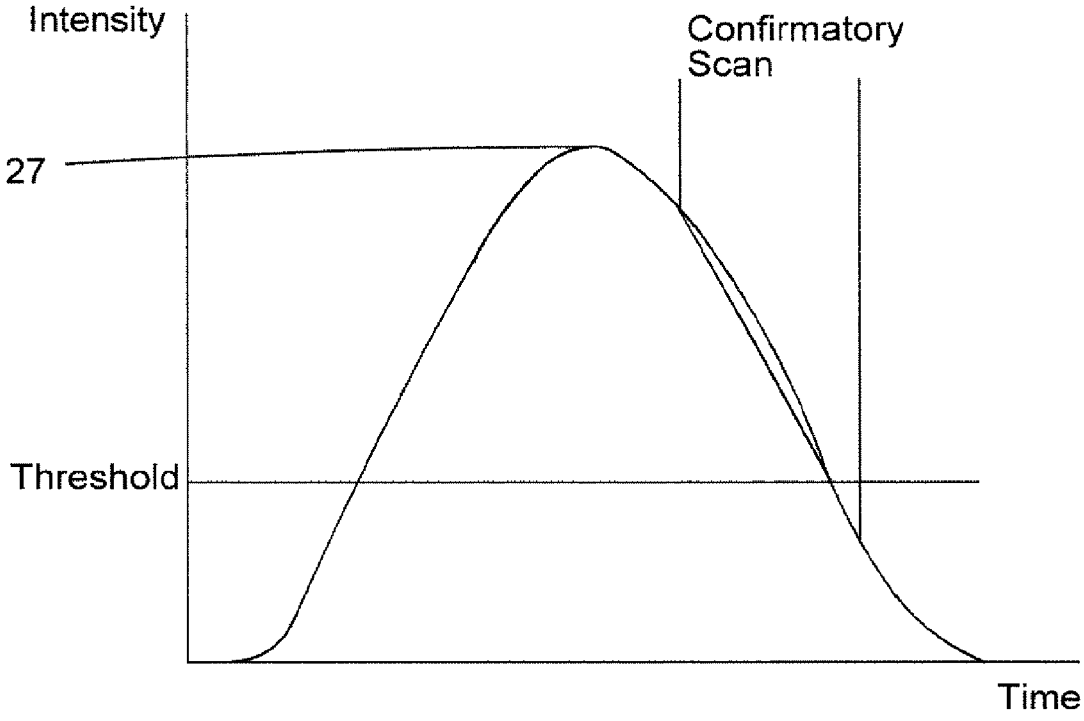
FIG. 3 shows a chromatographic peak analysed in accordance with the invention.

FIGS. 2 and 3 illustrate the benefit obtained from the invention by which the qualitative and quantitative data derived is improved. FIG. 2 illustrates a Chromatography peak and the readout that the mass spectrometer would receive using the prior art method of confirmation. In this example the data relating to the peak (25) is lost due to the confirmation scan being triggered by the threshold being crossed by the peak. The predetermined time for the confirmation scan covers substantially the whole of the peak, preventing quantitation to be performed.

FIG. 3 illustrates a Chromatography peak and the readout that the mass spectrometer would receive using the method of confirmation according to the invention. In this example the important pieces of the data relating to the peak (27) are retained but a confirmation scan is still performed.

In the preferred embodiment the threshold level may be defined as a multiple of the average level of noise over the first four data points in the MRM is measured and used to give an average noise value. The Threshold may be any multiple of this average noise value. In this embodiment it is assumed that a peak does not elute within the first four data points.

In the preferred embodiment the reset threshold is assigned to be a percentage of this threshold value.

In another embodiment the threshold may be defined as an ion count. When the signal rises above this ion count, the trigger will occur. The reset threshold may also be assigned as an ion count.

In another embodiment the threshold may be assigned by the differential of the rate of change of signal against time. A predetermined value for the rate of change of signal may be assigned. In this embodiment a large signal change between adjacent points may be related to the final intensity of the peak.

A chromatographic peak close to the threshold may or may not trigger depending on how the data points lie over the chromatographic peak shape.

Figure 4:
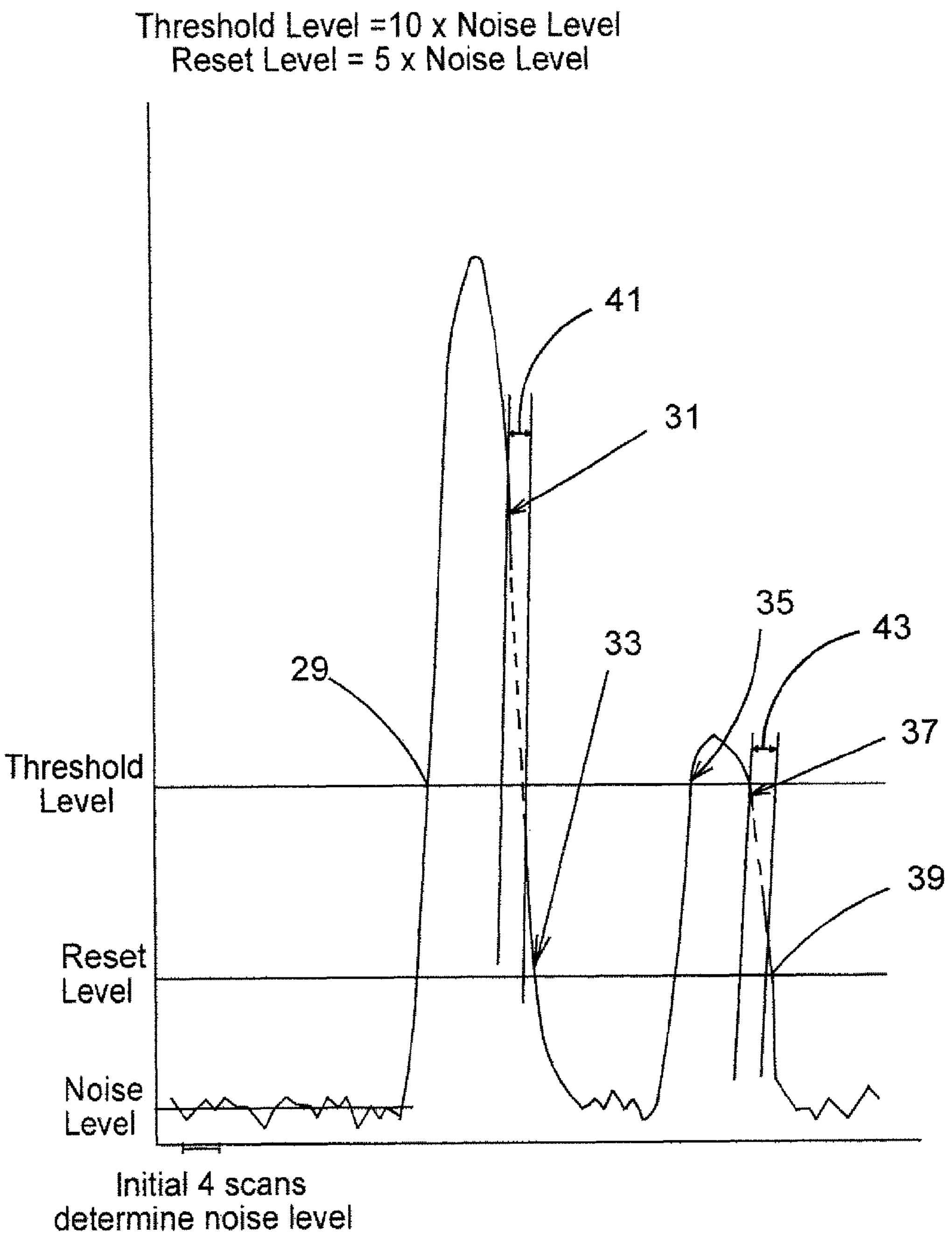
FIG. 4 is a series of chromatographic peaks showing the threshold triggering and reset criteria according to the present invention.

FIG. 4 illustrates a series of two chromatographic peaks treated in accordance with the preferred embodiment of the invention showing the threshold triggering and reset criteria in practice. The TIC rises above the threshold level at point 29. The instrument will continue to work in quantitative mode until the point at which three consecutive falling data points have been measured (31). A product ion confirmation scan is then performed. When the TIC reduces to the reset level 33, the threshold level is reset. Again, the TIC rises above the threshold level at point 35. The instrument will continue to work in quantitative mode until the point at which three consecutive falling data points have been measured 37. A product ion confirmation scan is then performed. When the TIC reduces to the reset level 39, the threshold level is reset. The data from the peaks lost by the confirmation scans (41 and 43) are shown by dotted lines. If the confirmation scan results in the peak data dropping below the reset line, the system resets automatically at the point where the system returns to a quantitative mode receiving data points below the reset level.

The invention claimed is:

1. A method of deriving improved data from a mass spectrometer comprising the steps of:

operating said mass spectrometer in a first mode enabling quantitation;

assigning a threshold value for the total ion current (TIC) above which mass spectral (MS) and/or tandem mass spectral (MS/MS) data is desired;

triggering said mass spectrometer out of said first mode enabling quantitation and into a second, MS and/or MS/MS data acquisition mode when said TIC rises above said threshold but wherein said triggering is delayed until such time at or after the maxima of a confirmed TIC peak has been measured.

2. A method of deriving improved data from a mass spectrometer as claimed in claim 1 wherein said triggering is delayed until a number n of TIC values measured have a descending trend.

3. A method of deriving improved data from a mass spectrometer as claimed in claim 2 wherein said number n is in the range 1-10.

4. A method of deriving improved data from a mass spectrometer as claimed in claim 2 wherein said number n is 3.

5. A method of deriving improved data from a mass spectrometer as claimed in claim 2 wherein said number n is 4.

6. A method of deriving improved data from a mass spectrometer as claimed in claim 1 wherein said confirmed TIC maxima is identified by a 2nd order differential.

7. A method of deriving improved data from a mass spectrometer as claimed in claim 1 wherein said threshold value for the TIC is a multiple of predetermined background noise level.

8. A method of deriving improved data from a mass spectrometer as claimed in claim 7 wherein said predetermined background noise level is determined by calculating the average level of noise over a number of data points.

9. A method of deriving improved data from a mass spectrometer as claimed in claim 1 wherein said threshold value for the TIC is the differential of the rate of change of signal against time.

10. A method of deriving improved data from a mass spectrometer as claimed in claim 1 further comprising a reset threshold.

11. A method of deriving improved data from a mass spectrometer as claimed in claim 10 wherein said reset threshold is a function of said threshold value.

12. A method of deriving improved data from a mass spectrometer as claimed in claim 1, wherein said first mode enabling quantitation comprises a multiple reaction monitoring mode.

13. A method of deriving improved data from a mass spectrometer according to claim 1, wherein said second, MS and/or MS/MS data acquisition mode comprises a confirmatory scanning mode.

14. A method of deriving improved data from a mass spectrometer comprising the steps of:

operating said mass spectrometer in a quantitaton mode;

assigning a threshold value for the total ion current (TIC) above which mass spectral data is desired;

triggering said mass spectrometer out of said quantitation mode and into a scanning mode, but wherein said triggering is delayed until at or after the maxima of a confirmed TIC peak has been measured and only if said TIC maxima is above said threshold value.

15. A method of deriving improved data from a mass spectrometer comprising the steps of:

operating said mass spectrometer in a quantitaton mode;

assigning a threshold value for the total ion current (TIC) above which mass spectral data is desired;

triggering said mass spectrometer out of said quantitation mode and into a confirmatory mode, but wherein said triggering is delayed until at or after the maxima of a confirmed TIC peak has been measured and only if said TIC maxima is above said threshold value.

16. A mass spectrometer specifically configured to carry out the method of deriving improved data according to claim 1 or claim 14 or claim 15.

17. A method of deriving improved data from a mass spectrometer according to claim 1, wherein the total ion current is not measured in said second mode.

18. A method of deriving improved data from a mass spectrometer according to claim 14, wherein the total ion current is not measured in said scanning mode.

* * * * *